United States Patent

[11] 3,569,901

[72] Inventor John A. Connor
 Tarzana, Calif.
[21] Appl. No. 770,629
[22] Filed Oct. 25, 1968
[45] Patented Mar. 9, 1971
[73] Assignee TRW Inc.
 Redondo Beach, Calif.

[54] THERMAL-MATING BIMETAL ROLLPINS
 4 Claims, 8 Drawing Figs.
[52] U.S. Cl............................................. 339/30,
 24/201, 24/243, 339/47
[51] Int. Cl........................................ A44b 19/00,
 H01r 13/20, H01r 25/00
[50] Field of Search..................................... 287/(Inquired);
 24/201, 201.3, 243, (Inquired);
 339/30, 47, 49; 85/37, (Inquired)

[56] References Cited
 UNITED STATES PATENTS
 1,635,831 7/1927 Gagnon....................... 339/30
 2,377,222 5/1945 Fruth............................ 339/30
 FOREIGN PATENTS
 25,965 9/1963 Germany..................... 339/47

Primary Examiner—Marvin A. Champion
Assistant Examiner—Terrell P. Lewis
Attorneys—Daniel T. Anderson, Gerald Singer and Alfons Valukonis ABSTRACT: There is disclosed a set of two mutually supporting metallic elements which, when mated, form a combined structure with assured holding force sufficient to maintain good mechanical and electrical connection over a substantial temperature excursion both above and below room temperature. Each of the metallic elements consists of a fabricated bimetal rollpin which is cylindrical in shape with an incomplete circular cross section so that a pair of elements may be inserted one within the other to establish mechanical and electrical contact. Each of the elements consists of two metallic layers. The metal comprising the outer layer on one element comprises the inner layer on the other element and the metal comprising the inner layer on the first element comprises the outer layer on the second element. In this manner the two rollpins are provided with opposite or complementary thermal expansion and contraction characteristics so that the connection once made remains firm and tight independently of excursions of ambient temperature.

Patented March 9, 1971

John A. Connor
INVENTOR.

BY
Donald C. Kearney
ATTORNEY

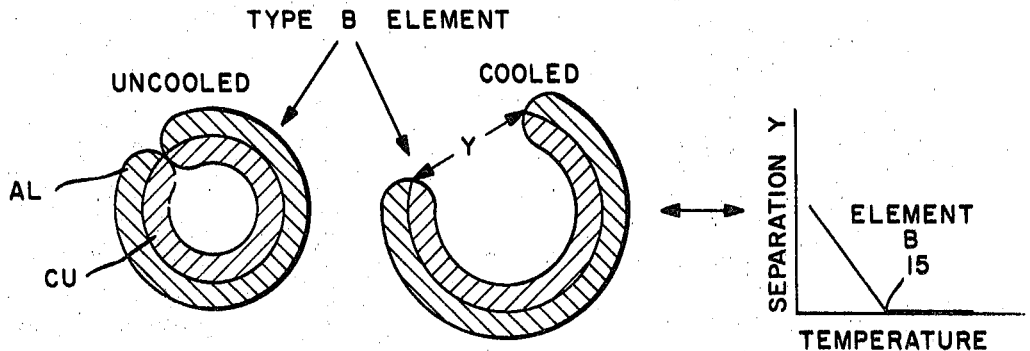
Fig.4
Fig.5
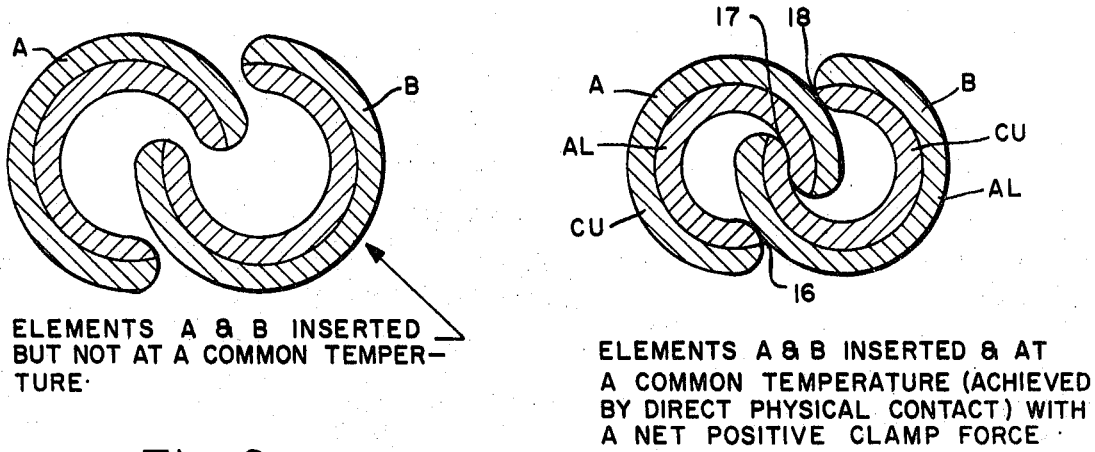
Fig.6
Fig.7
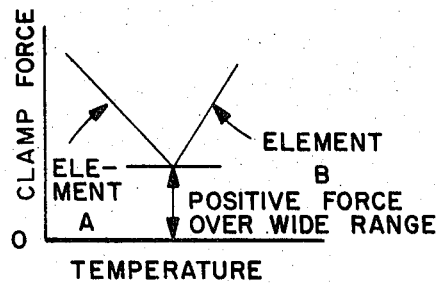
Fig.8
John A. Connor
INVENTOR
BY
Donald C. Keaveney
ATTORNEY

THERMAL-MATING BIMETAL ROLLPINS

BACKGROUND OF THE INVENTION

1. Field of the Invention

This invention relates to electrical and mechanical connector devices which are intended to maintain contact independently of excursion of ambient temperature.

2. Description of the Prior Art

To the extent that bimetallic elements have been used in prior art devices they have been intended to compensate only for an increase in the temperature of the conductor itself caused by increased resistance at the point of contact resulting in an increasing temperature. Devices of the type which are concerned solely with compensating for heat generated by the circuit itself are exemplified by the following patents: 2,982,937; 2,921,146; 1,635,831; 1,603,679 and 1,635,830. Whatever the intended operating temperature range of these devices may be, they all had in common the fact that the use of a single bimetal element permits an effective correction only in one direction of temperature change. Such a device is inherently not suited to environments in which extreme temperature changes in both directions may be encountered.

SUMMARY OF THE INVENTION

This problem of the prior art is solved by applicant, as noted above, by providing complementary bimetal rollpins having opposite thermal expansion characteristics so that the mechanical and electrical connection once established will be maintained. By virtue of the opposite thermal expansion characteristics of the devices and by virtue of their shape and interference fit, it has been found that an increase in temperature which will cause one of the rollpins to expand will cause the other to contract thereby maintaining the original fit whereas a decrease of temperature will cause the first to contract and the second to expand again maintaining the original fit.

The rollpins themselves may be used simply as mechanical connection pins or electrical leads may be soldered or otherwise connected to them, the pins thus serving merely as detachable connectors at the end of a wire or cable.

BRIEF DESCRIPTION OF THE DRAWING

FIG. 4 is a cross section view of a second type of bimetal element showing the element in both its uncooled or room temperature state or its cooled state.

FIG. 5 is a graph showing the expansion characteristics of the element of FIG. 4 as a function of temperature.

FIG. 6 is a cross section view showing the interfitting relationships of the two types of elements when they are at different temperatures.

FIG. 7 is a view similar to FIG. 6 but showing the relationship of the elements when they are a common temperature.

FIG. 8 is a graph showing the clamping force of the elements as a function of temperature.

DESCRIPTION OF THE PREFERRED EMBODIMENT

Figure 1:
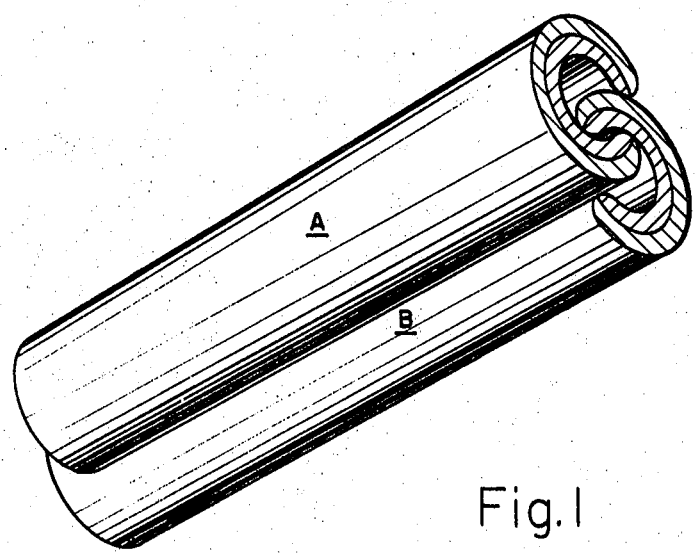
FIG. 1 is an isometric view of the bimetal elements in assembled relationship.

There is shown in FIG. 1 a pair of rollpins, A and B, in their assembled or mated or interlocked condition. Each of the rollpins comprises a laminated bimetal element. The two rollpins, however, are opposite in the sense that the inner metal of one is used as the outer metal of the other in order to given the two elements opposite thermal expansion characteristics. Thus, as shown, the element A will increase in diameter as the temperature is increased whereas the element B will decrease in diameter of cross section as the temperature is increased.

The two rollpins A and B are fitted into each other either by forcing the edge of one through the axial slit of the other at room temperature condition or by heating a type A element, cooling a type B element, inserting the pair into each other in their expanded state which increases the size of the slit opening in each, and then allowing both elements to achieve the same temperature by direct physical contact. The nominal dimensions, that is to say, the dimensions at room temperature when the elements have been neither heated nor cooled, for the set of type A and type B elements provides an interference fit. With a common temperature of a mated set of bimetal rollpins which necessarily result over a period of time from their physical contact, the lateral force holding these two elements in union is maintained positive over a wide range of temperatures and dynamic forces. The mated set of bimetal rollpins can, of course, be unmated without destruction by withdrawal along their longitudinal or insertion axes. The set thus constitutes a detachable or reusable electrical connection which has extremely good holding force independent of temperature over a very wide ambient range while it is in the connected state.

Figures 2, 3:
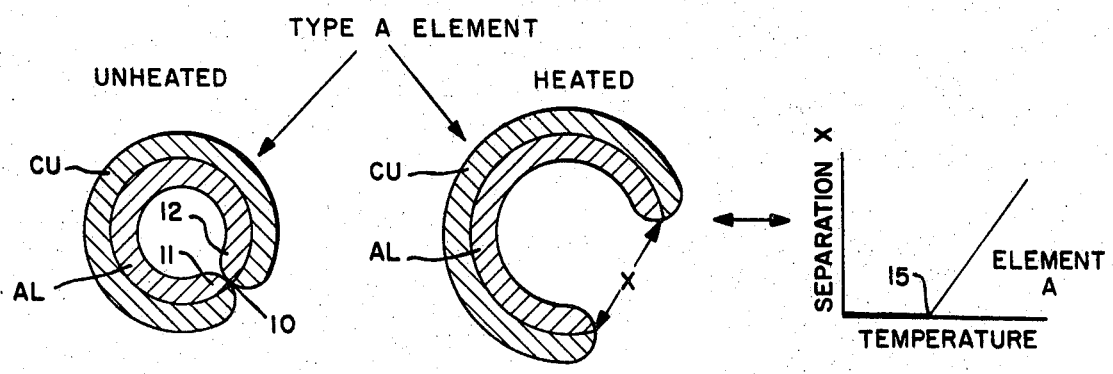
FIG. 2 is a cross-sectional view of a first type of bimetal element showing the element in both its unheated and heated state.
FIG. 3 is a graph showing the expansion characteristics of the element of FIG. 2 as a function of temperature.

In FIG. 2 there is shown first a cross section of a type A element in its unheated state and secondly a cross section of the same element in its heated state. It will be noted that the outer layer or lamination of the type A element in its preferred specific embodiment may comprise copper whereas the inner layer or laminate is aluminum. The overall rollpin is cylindrical in configuration the cross section of course being generally circular in its unheated or room temperature state. The element actually has an incomplete circular cross section due to the fact that an axial slit extends the full length of each of the elements. In FIG. 2 it will be noted that the axial slit 10 is formed by the abutting ends 11 and 12 of the opposed segments of bimetal element. Both the inner edge of the inner laminate and the outer edge of the outer laminate are rounded or chamfered at the edges forming the slit in order to facilitate insertion of one element into the other.

When the type A element is heated the cross section of the element expands due to the bimetal thermal action and the slit is widened to have a dimension X as shown in the "heated" view in FIG. 2. In FIG. 3 there is shown a graph plotting the separation dimension X as a function of temperature for this type A element. The characteristics represented are those which are achieved by using copper as the first or outer metal in a type A element where the copper has a coefficient of thermal expansion of 14 parts per million per degree Centigrade and using aluminum as the second or inner metal where the aluminum has a coefficient of thermal expansion of 24 parts per million per degree Centigrade. This is in fact the coefficient of expansion of a commercial alloy of aluminum commonly sold as aluminum. It will be noted that the second or inner metal has a higher coefficient of linear expansion with temperature than does the first or outer metal. This fact, of course, explains why the type A element will expand when it is heated.

The type B element shown in FIG. 4 is exactly the same as the type A element in all respects except that the particular metals used in the laminate are reversed.

That is to say, in the type B element the outer laminate is made of aluminum whereas the inner laminate is made of copper. In as much as the positions of the two have been reversed the thermal action will also be reversed. Since the aluminum which is the metal with the higher temperature expansion coefficient is now on the outside, an increase in temperature will cause a force tending to contract the cross section of the rollpin. In order therefore to expand the cross section of a type B element it is necessary to cool the element below room temperature at which its normal cross section is defined. Such an expansion as illustrated in the view labeled "cooled" in FIG. 4 results in a separation of the slit by an amount indicated by Y in the drawing. In FIG. 5 there is plotted a graph of the magnitude of the separation Y as a function of temperature.

The thermal expansion characteristics illustrated in FIGS. 3 and 5 are achieved through the use of copper and aluminum as explained above or through the use of any other suitable metals having similar thermal expansion characteristics. In order to improve the electrical contact between the elements their entire surface is preferably provided with a gold flashing. If desired the points of normal contact can also be roughened with axial channels or grooves in the surface. This is not normally necessary, however, since the scraping due to the relative motion of the elements tends to clean the surfaces and thus keep good electrical contact.

The manner of assembling the elements is illustrated in FIGS. 6 and 7. In FIG. 6 there is shown a type A element which has been treated and a type B element which has been cooled in order to produce expansion in both of them so that they may be easily interlocked. As noted above, it is not actually necessary to heat or cool the elements in order to insert one into the other since they can simply be force fitted together by springing apart the abutting edges forming the slit 10. The choice between the methods of connection is purely a matter of convenience.

In FIG. 7 there is illustrated the cross-sectional configuration of a pair of the elements after they have been inserted within each other as shown in FIG. 6 and furthermore have been permitted to achieve a common temperature by direct physical contact. This action results in a net positive clamping force.

In FIG. 8 the clamping force is plotted graphically as a function of temperature by combining the temperature characteristics shown in FIGS. 3 and 5. The net clamping force at room temperature, of course, results simply from the spring action inherent in the cross-sectional shape and configuration of the elements. The room temperature point is indicated by the reference character 15 in each of the graphs of FIGS. 3, 5 and 8. It will be seen that this positive clamping force is actually a minimum at room temperature as is illustrated by the location of the point 15 in FIG. 8. If the temperature is raised, the heating action will cause some expansion of the type A element, but it will cause contraction of the type B element which will therefore seat more firmly upon the portion of the type A element held within its slit. Conversely, if the ambient temperature is decreased, the type B element will have some expansion but the type A element will have a contractive force which will clamp on to that portion of the type B element which is inserted between its slit forming members. Thus, whichever way the ambient temperature is changed one or the other of the elements will maintain a firm electrical contact.

It should also be noted in FIG. 7 that all possible combinations of metal-to-metal contact are made. Thus, at point 16 there is contact between two aluminum members. At point 17 there is contact between a copper member in element B and the aluminum member in element A, whereas at point 18 there is contact between the copper member of element B and the copper member of element A.

While a specific preferred embodiment of the invention has been described by way of illustration only, it will be understood that the invention is capable of many other embodiments and modifications and is defined solely by the following claims.

I claim:

1. A set of two mutually supporting metallic elements which combine to form a structure with assured holding force sufficient to maintain good mechanical and electrical connection over a wide temperature range comprising:
    a. a pair of complementary bimetal rollpin elements, each of said rollpins being cylindrical in shape with an incomplete circular cross section so that said pair of elements may be fitted into each other to have an interference fit at room temperature;
    b. each of said rollpins having an inner and outer metallic layer to provide temperature responsive changes in the cross section of said rollpins; and
    c. the metals of a first of said elements being such as to produce expansion of the cross section of said element when it is heated and the metals of the other of said elements being such as to produce expansion of the cross section of said other element when it is cooled.

2. Apparatus as in claim 1 wherein each of said rollpins is formed from the same two metals with the particular metals being oppositely disposed so that the inner layer of the first element and the outer layer of the second element are formed of a first metal whereas the outer layer of the first element and the inner layer of the second element are formed of a second metal.

3. Apparatus as in claim 2 wherein said first metal is aluminum and said second metal is copper.

4. Electrical contact means comprising:
    a. first and second thermal bimetal rollpins;
    b. each of said rollpins having a cylindrical configuration with an incomplete circular cross section resulting from a slit formed along the side of the rollpin;
    c. said rollpins being shaped and dimensioned to be spring biased into electrical contact by an interference fit when interlocked through the slits at a predetermined normal temperature; and
    d. said rollpins having opposite thermal expansion characteristics so as to maintain electrical and mechanical contact over a temperature excursion both above and below said predetermined normal temperature.